US011938357B2

(12) United States Patent
Bogart et al.

(10) Patent No.: US 11,938,357 B2

(45) Date of Patent: *Mar. 26, 2024

(54) INTEGRATED AIR DISTRIBUTION SYSTEM AND FIRE SUPPRESSION SYSTEM

(71) Applicant: Johnson Controls Tyco IP Holdings LLP, Milwaukee, WI (US)

(72) Inventors: James E. Bogart, Glen Rock, PA (US); Derek M. Sandahl, Wallace, MI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,688

(22) Filed: Jul. 1, 2022

(65) Prior Publication Data

US 2022/0331628 A1 Oct. 20, 2022

Related U.S. Application Data

(63) Continuation of application No. 16/200,327, filed on Nov. 26, 2018, now Pat. No. 11,376,454.

(60) Provisional application No. 62/752,214, filed on Oct. 29, 2018.

(51) Int. Cl.

| | |
|---|---|
| ***A62C 35/00*** | (2006.01) |
| ***A62C 2/06*** | (2006.01) |
| ***A62C 35/02*** | (2006.01) |
| ***F24F 11/33*** | (2018.01) |

(52) U.S. Cl.

CPC ................ *A62C 3/14* (2013.01); *A62C 35/00* (2013.01); *A62C 35/02* (2013.01); *F24F 11/33* (2018.01)

(58) Field of Classification Search

CPC ..... A62C 99/0018; A62C 35/00; A62C 35/02; A62C 3/14; F24F 11/32–35

See application file for complete search history.

(56) References Cited

U.S. PATENT DOCUMENTS

| | | | |
|---|---|---|---|
| 3,780,812 | A | 12/1973 | Lambert |
| 6,491,254 | B1 | 12/2002 | Walkinshaw et al. |
| 9,010,449 | B2 | 4/2015 | Eckholm et al. |
| 9,737,740 | B2 | 8/2017 | Beresford |
| 2008/0064316 | A1 | 3/2008 | Ng |
| 2015/0144311 | A1 | 5/2015 | Grabon |
| 2015/0157886 | A1 | 6/2015 | Janik |
| 2016/0206904 | A1 | 7/2016 | Seneca et al. |

(Continued)

FOREIGN PATENT DOCUMENTS

| | | | |
|---|---|---|---|
| KR | 101429958 | * 5/2013 | ............ A62C 2/242 |
| KR | 20180032122 | 3/2018 | |

(Continued)

OTHER PUBLICATIONS

DDC, "ScaleMatrix Cabinet Technology", Website: https://www.ddcontrol.com/, Nov. 26, 2018, pp. 1-23.

*Primary Examiner* — Christopher R Dandridge

(74) *Attorney, Agent, or Firm* — Fletcher Yoder, P.C.

(57) ABSTRACT

Embodiments of the present disclosure relate to an air handling unit having a housing that defines an air flow path therethrough, a heat exchanger disposed within the air flow path and configured to flow a working fluid therethrough, and a nozzle configured to deliver a fire suppression agent into the air flow path.

20 Claims, 7 Drawing Sheets

(56) References Cited

U.S. PATENT DOCUMENTS

| | | | |
|---|---|---|---|
| 2017/0064876 | A1 | 3/2017 | Leckelt et al. |
| 2018/0229062 | A1 | 8/2018 | Meis et al. |

FOREIGN PATENT DOCUMENTS

| | | | | | |
|---|---|---|---|---|---|
| WO | 2007105610 | | | 9/2007 | |
| WO | WO-2013175255 | A1 | * | 11/2013 | ............... A62C 3/00 |

* cited by examiner

INTEGRATED AIR DISTRIBUTION SYSTEM AND FIRE SUPPRESSION SYSTEM

CROSS REFERENCE TO RELATED APPLICATIONS

This application is a continuation of U.S. patent application Ser. No. 16/200,327, entitled "INTEGRATED AIR DISTRIBUTION SYSTEM AND FIRE SUPPRESSION SYSTEM" filed Nov. 26, 2018, and expected to issue as U.S. Pat. No. 11,376,454, which claims priority from and the benefit of U.S. Provisional Application Ser. No. 62/752,214, entitled "INTEGRATED AIR DISTRIBUTION SYSTEM AND FIRE SUPPRESSION SYSTEM," filed Oct. 29, 2018, each of which is hereby incorporated by reference in its entirety for all purposes.

BACKGROUND

The disclosure relates generally to heating, ventilation, and/or air conditioning (HVAC) systems, and specifically, to an integrated fire suppression system and an air distribution system for HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and/or air conditioning (HVAC) systems are utilized in residential, commercial, and industrial applications to control environmental properties, such as temperature and humidity, for occupants of respective environments. The HVAC system may control the environmental properties through control of an air flow delivered to and ventilated from spaces serviced by the HVAC system. For example, an HVAC system may transfer heat between refrigerant flowing through the HVAC system and an air flow in order to condition the air flow. The conditioned air flow may be directed to a space serviced by the HVAC system. Some spaces may also be serviced by a fire suppression system that may be operated to extinguish a fire, such as by directing a fire suppression agent into the space during an occurrence of a fire. In traditional systems, the fire suppression system and the HVAC system are separate from one another. In other words, a space may be serviced by a separate fire suppression system implemented to suppress and/or avert an occurrence of a fire in the space. The space may also be serviced by an HVAC system implemented to condition air in the space, where the HVAC system is separately and/or independently operated from the fire suppression system. Separate fire suppression systems and HVAC systems may increase a complexity of operation and/or cost to service a space.

SUMMARY

In one embodiment, an air handling unit includes a housing that defines an air flow path therethrough, a heat exchanger disposed within the air flow path and configured to flow a working fluid therethrough, and a nozzle configured to deliver a fire suppression agent into the air flow path.

In another embodiment, an air distribution system for a heating, ventilation, and/or air conditioning (HVAC) system, includes a housing defining an air flow path, and having a first opening and a second opening, in which the housing is configured to receive an air flow via the first opening, direct the air flow through the air flow path, and deliver the air flow via the second opening. The HVAC system further includes a heat exchanger disposed within the air flow path, a fan disposed within the housing and configured to drive the air flow through the air flow path, a fire suppression system that includes an nozzle configured to deliver a fire suppression agent into the air flow path, and a controller configured to operate the fire suppression system to deliver the fire suppression agent into the air flow path. The heat exchanger is configured to flow a working fluid to facilitate heat exchange between the working fluid and the air flow.

In another embodiment, a heating, ventilation, and/or air conditioning (HVAC) system includes a housing defining an air flow path, a fan configured to direct an air flow through the air flow path of the housing, a heat exchanger disposed within the air flow path, and a fire suppression system configured to direct a fire suppression agent through a nozzle configured to deliver the fire suppression agent into the air flow path of the housing. The heat exchanger is configured to place the air flow in thermal communication with a working fluid flowing through the heat exchanger.

DRAWINGS

Various aspects of this disclosure may be better understood upon reading the following detailed description and upon reference to the drawings in which.

Figure 6:
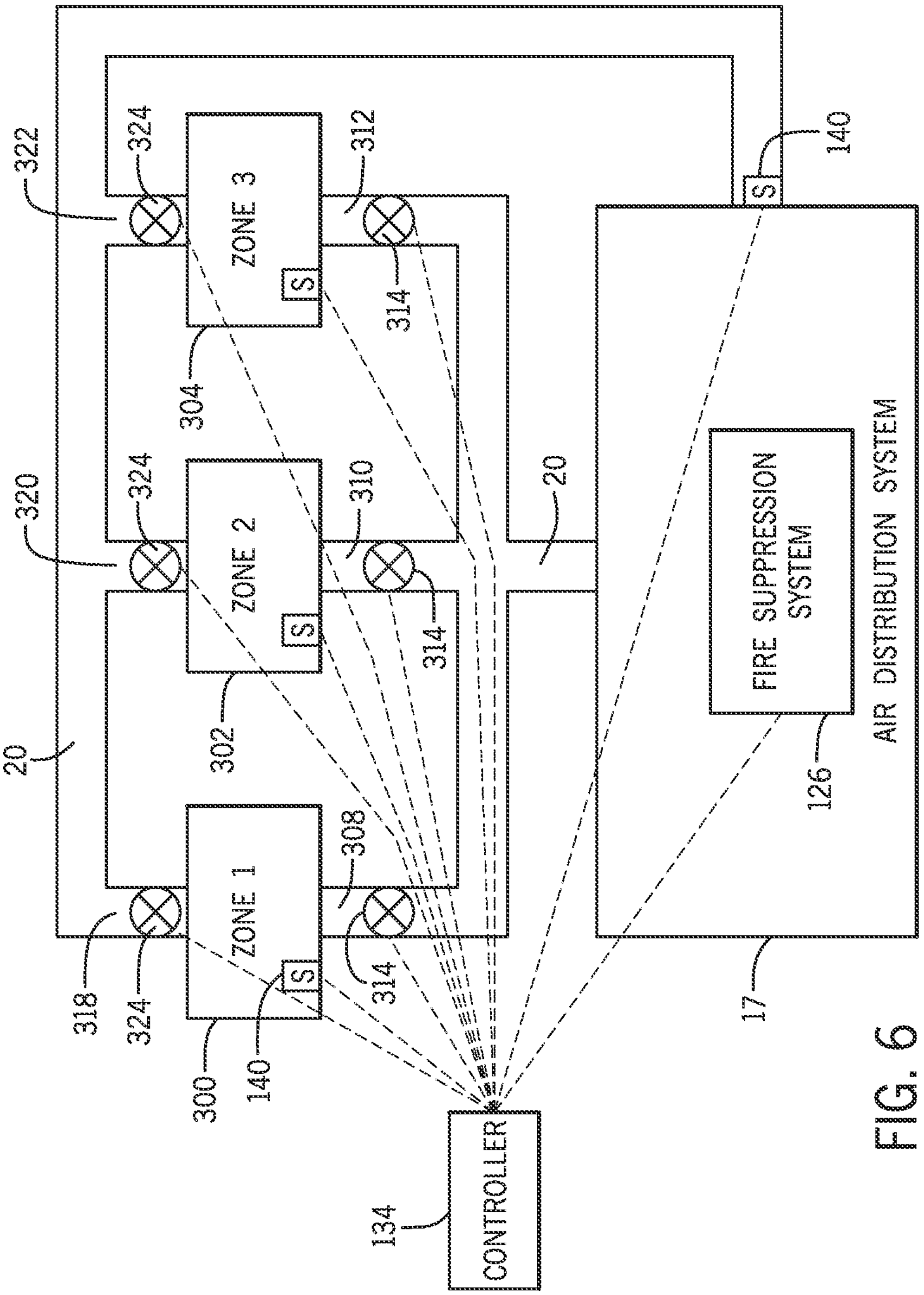
Figure 7:
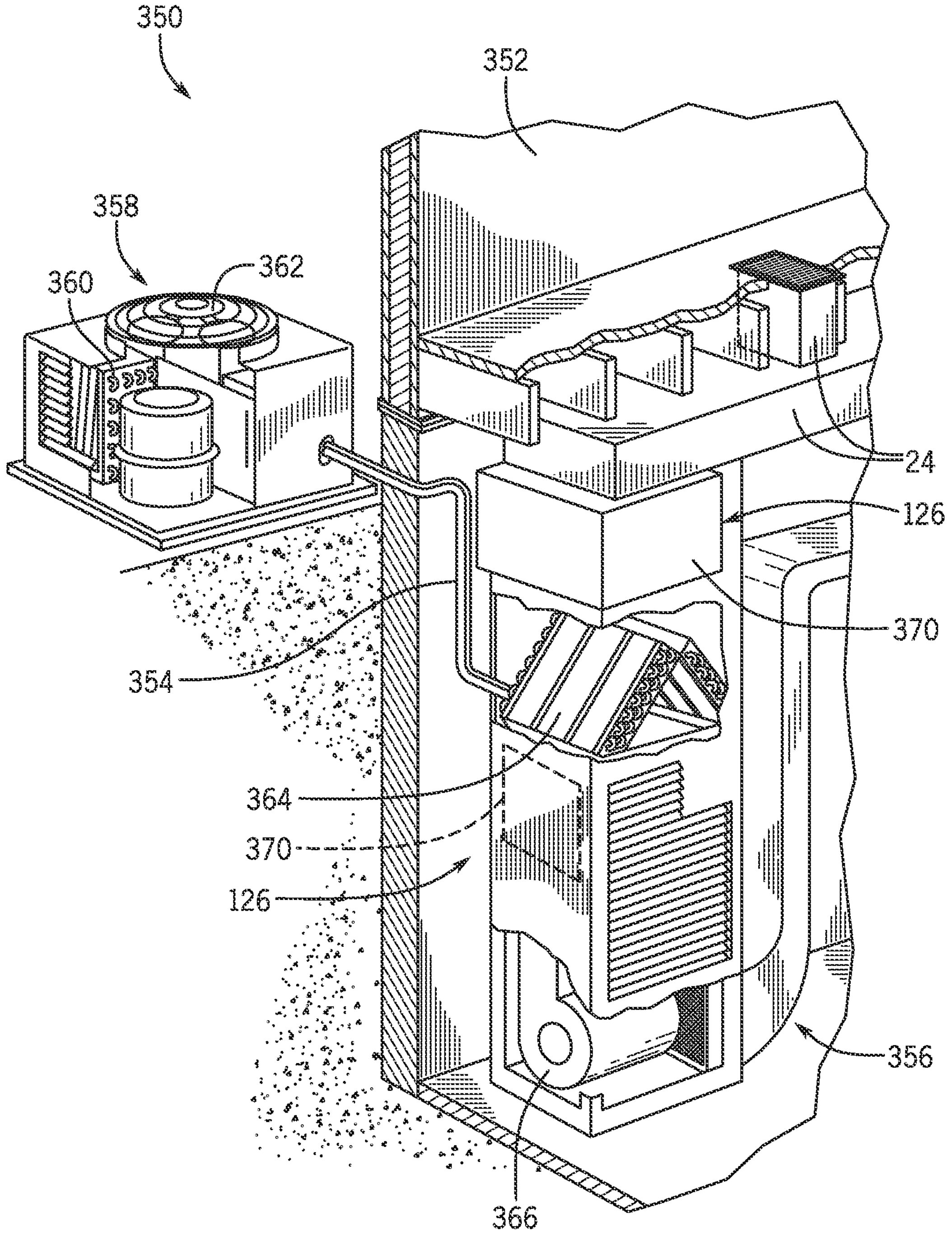

FIG. 6 is a schematic view of an embodiment of an air distribution system that includes a fire suppression system, where the air distribution system is implemented to direct air and/or fire suppressant to different zones, in accordance with an aspect of the present disclosure; and FIG. 7 is a schematic of an embodiment of a residential heating and cooling system that includes a fire suppression system, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to a heating, ventilation, and/or air conditioning (HVAC) system that includes an air distribution system implemented to receive air from and to direct air to spaces serviced by the HVAC system. For example, air may be directed from a space into the air distribution system, where the air is directed through an air flow path of the air distribution system. Along the air flow path, the air may be conditioned, such as by undergoing cooling and/or heating via heat exchangers positioned within the air flow path of the air distribution system. After being conditioned, the air may be directed out of the air distribution system and into a space serviced by the HVAC system.

A fire suppression system may also be implemented to extinguish a fire occurring in the space. For example, the fire suppression system may output or deliver a fire suppression agent when combustion products or other parameters are detected in the space. As described herein, a fire suppression agent may include any chemicals, particles, and/or other substances that may be output by the fire suppression system into the space. For example, the fire suppression agent may include a fluid, such as an inert gas. The fire suppression system may include a vessel to hold the fire suppression agent, conduits to direct the fire suppression agent from the vessel, an orifice to output the fire suppression agent, and a control system for operating the fire suppression system. Certain existing spaces include separate equipment for the fire suppression system and the HVAC system. As a result, an available area within the space for positioning the separate fire suppression system equipment may be limited. Further, separate fire suppression systems and HVAC systems may result in redundant equipment and undesirable complexity to condition and monitor the space.

Thus, in accordance with certain embodiments of the present disclosure, it is presently recognized that integrating a fire suppression system with an HVAC system may improve servicing of the space. That is, integration of a fire suppression system with HVAC equipment may improve implementation of HVAC and fire suppression operations to service the space. Specifically, an air distribution system of the HVAC system may be implemented to condition air that is directed through an air flow path of the air distribution system. An integrated fire suppression system may be included with the air distribution system to output a fire suppression agent into the air flow path to enable combination of the air and the fire suppression agent within the air distribution system. After mixing within the air distribution system, the air distribution system may then direct the combined air and fire suppression agent to spaces serviced by the HVAC system. In other words, the air distribution system may simultaneously deliver conditioned air and fire suppression agent to the space, as the air supplied by the air distribution system may be used to distribute the fire suppression agent to the space. Accordingly, a cumulative footprint of the air distribution system and fire suppression system may be reduced, undesired component redundancy may be mitigated, and operation of the systems may be improved.

Figure 1:
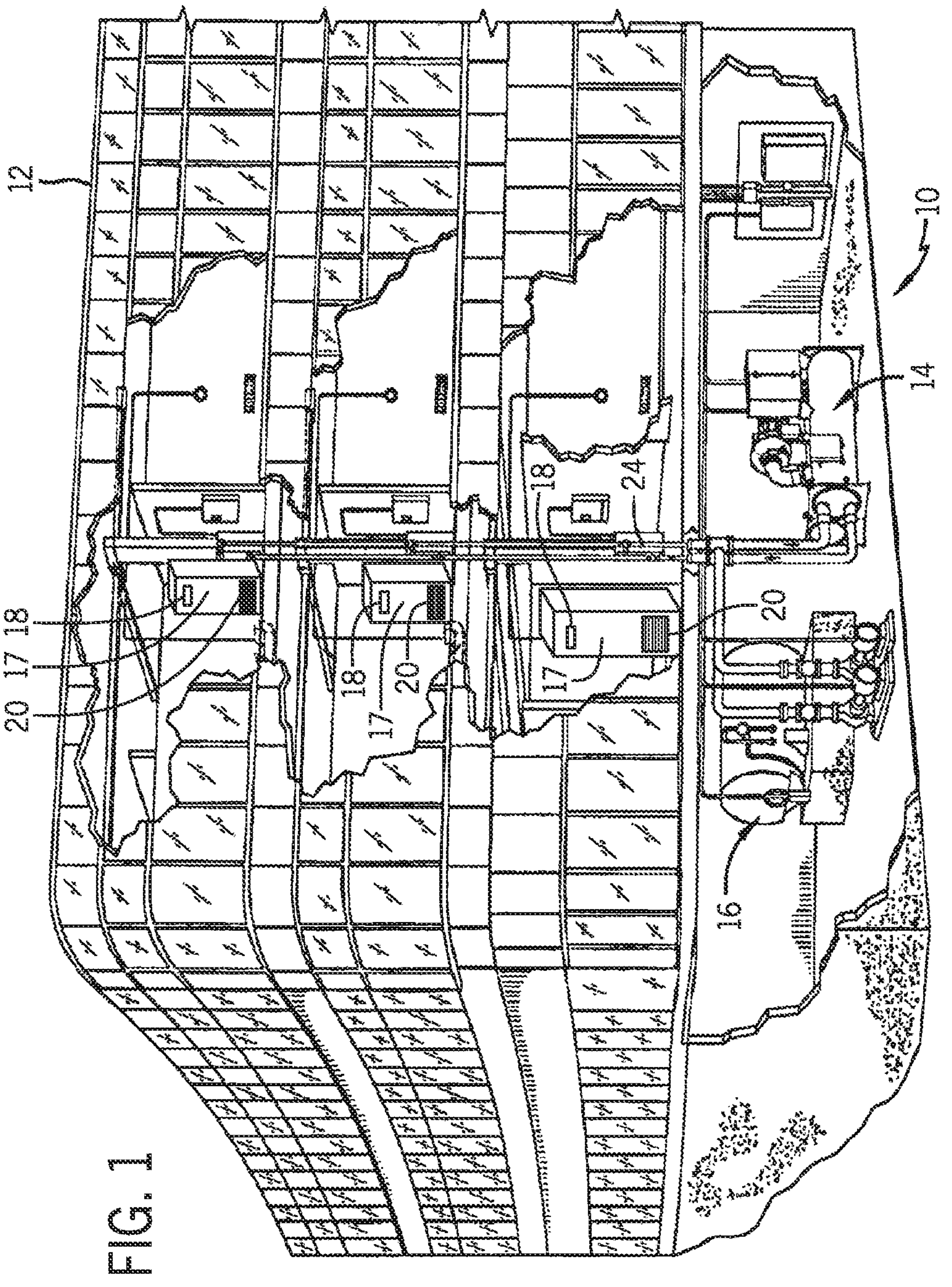
FIG. 1 is a perspective view of an embodiment of a building that may utilize a heating, ventilation, and/or air conditioning (HVAC) system in a commercial setting, in accordance with an aspect of the present disclosure.

Turning now to the drawings, FIG. 1 is a perspective view of an embodiment of a heating, ventilation, and/or air conditioning (HVAC) system 10 for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 12 may be serviced by the HVAC system 10. The building 12 may be a commercial structure or a residential structure. The HVAC system 10 may include a mechanical refrigeration system 14, such as a chiller, that supplies a chilled liquid, which may be used to cool air supplied to the building 12. The HVAC system 10 may also include a boiler 16 to supply warm liquid to heat air supplied to the building 12 and one or more air distribution systems 17, or air handling units, to condition air supplied to the building 12 with the chilled liquid provided by the mechanical refrigeration system 14 and/or the warm liquid provided by the boiler 16. In some embodiments, the air distribution system 17 may cool, heat, or otherwise condition air supplied to the building 12 in other manners, such as via a refrigerant circuit or other cooling/heating fluid circuit.

The air distribution system 17 may also circulate air through the building 12. In the illustrated embodiment, the air distribution system 17 includes an air return duct 18 implemented to direct air from the building 12 into the air distribution system 17 and air supply duct 20 implemented to direct from the air distribution system 17 to the building 12. The air distribution system 17 may be implemented to condition the air received from the air return duct 18 and to direct the air to the air supply duct 20.

In some embodiments, the air distribution system 17 may include a heat exchanger that is fluidly connected to the boiler 16 and/or the mechanical refrigeration system 14 by fluid conduits 24. The heat exchanger within the air distribution system 17 may receive warm liquid from the boiler 16 and/or chilled liquid from the mechanical refrigeration system 14, depending on a mode of operation of the HVAC system 10. For example, the air may be placed in thermal communication with warm liquid from the boiler 16 to be heated and/or the air may be placed in thermal communication with chilled liquid from the mechanical refrigeration system 14 to be cooled. Although FIG. 1 illustrates that the HVAC system 10 includes the mechanical refrigeration system 14 and the boiler 16 to condition air, it should be understood that the HVAC system 10 may include another heat exchanging apparatus to condition the air. Furthermore, it should be understood that heat exchangers of the HVAC system 10 may be positioned elsewhere, such as within each air distribution system 17, external to the building 12, or another suitable location.

The HVAC system 10 is shown with separate air distribution systems 17 on each floor of building 12, but in other embodiments, the HVAC system 10 may include air distribution systems 17 and/or other components that may be shared between or among floors. Additionally, individual rooms of the building 12 may be associated with respective air distribution systems 17. Further, in some embodiments, the air distribution system 17 may be positioned on a ground of each room, mounted to a ceiling of each room, mounted to a wall of each room, disposed within a closet or other space adjacent to each room, and so forth.

The HVAC system 10 may include a fire suppression system. Specifically, the fire suppression system may be integrated with the air distribution system 17 to enable distribution of a fire suppression agent via air supplied to designated areas. For example, each air distribution system 17 may include a separate or individual fire suppression system integrated therein. The fire suppression system may be implemented to output the fire suppression agent into the air distribution system 17 to then be distributed into spaces serviced by the HVAC system 10 by the air distribution system 17. In other words, the fire suppression system may output the fire suppression agent into an air flow path of the air distribution system 17, where the fire suppression agent may mix with the air flow conditioned by the air distribution system 17. When the air distribution system 17 supplies the conditioned air flow into spaces serviced by the HVAC system 10, the combined fire suppression agent and conditioned air flow may be supplied to the spaces serviced by the HVAC system 10.

Integrating the fire suppression system with the air distribution system 17 of the HVAC system 10 may provide improved cost efficiencies to the HVAC system 10. For example, fire suppression equipment may be positioned within a housing of the air distribution system 17 rather than in the different spaces serviced by the HVAC system 10 or other areas of the building 12. In other words, instead of installing and placing separate fire suppression systems into or adjacent to each respective space to be conditioned by the HVAC system 10, a fire suppression system integrated with the air distribution system 17 may be implemented to supply the fire suppression agent to multiple spaces of the building 12. As a result, a cost of installing fire suppression equipment may be reduced. Additionally, as the fire suppression system is no longer installed into an area of the building 12 separate from the air distribution system 17, an available area in the building 12 may be increased. Indeed, an area, which may otherwise be occupied by fire suppression equipment, may be vacant when the fire suppression system is integrated with the air distribution system 17, in accordance with present embodiments. Accordingly, the cumulative footprint of the fire suppression system and the air distribution system 17 is reduced. Furthermore, the fire suppression system and the air distribution system 17 may be operated together, which may limit a complexity and/or a redundancy of operations to condition each space and which may improve operations of the fire suppression system and/or air distribution system 17.

Figure 2:
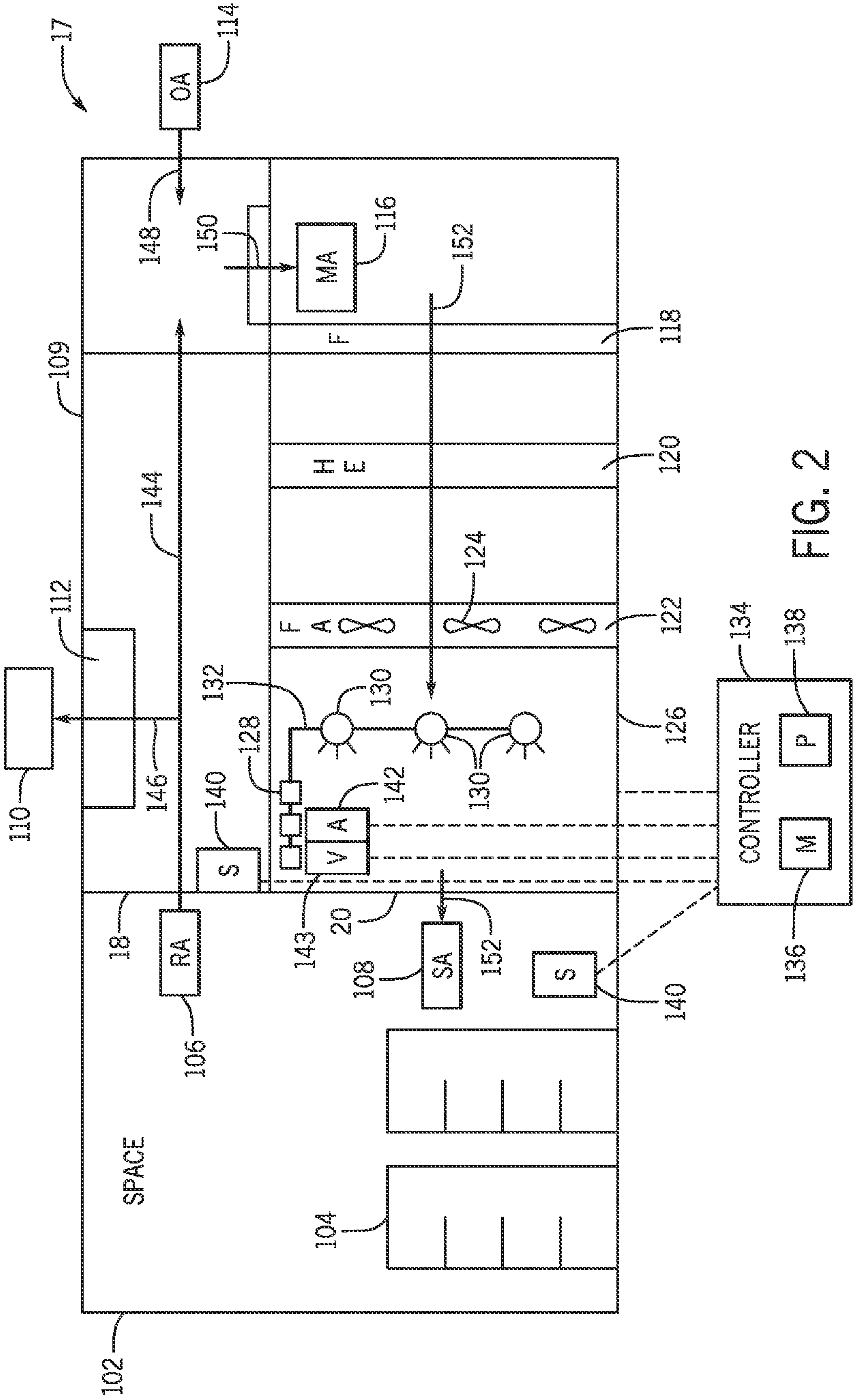
FIG. 2 is a schematic view of an embodiment of an air distribution system integrated with a fire suppression system, which may be utilized in an HVAC system, in accordance with an aspect of the present disclosure.

FIG. 2 is a schematic of an embodiment of the air distribution system 17 that may be used to condition a space 102, such as an area within the building 12. As an example, the space 102 may be a data center used for managing a structure's technological equipment 104, which may include computers, servers, or other electrical equipment. The air distribution system 17 may be implemented to condition air within and supplied to the space 102. For example, the air distribution system 17 may be used to heat and/or cool the space 102 to enable the technological equipment 104 to perform at particular efficiency. For example, an air flow may enter the air distribution system 17 through the air return duct 18 of the air distribution system 17 as return air 106, and the air flow may exit the air distribution system 17 through the air supply duct 20 of the air distribution system 17 as supply air 108 to condition the space 102. The air distribution system 17 may include a housing 109 that includes the air return duct 18 and/or the air supply duct 20. The air flow may be directed through an air flow path within the housing 109 to enable the air flow to be conditioned within the housing 109 before being delivered to the space 102 as the supply air 108.

When return air 106 enters the housing 109 of the air distribution system 17, a portion 110 of the return air 106 may exit the air distribution system 17. For example, a portion of the return air 106 may be removed from the air distribution system 17 via an exhaust 112. In certain embodiments, the return air 106 that does not exit the housing 109 via the exhaust 112 may combine with outside air 114, such as an ambient air, to produce mixed air 116. As will be appreciated, the air distribution system 17 may include dampers, such as an exhaust damper and/or an outside air damper to regulate an amount of the return air 106 that exits the air distribution system 17 and/or an amount of the outside air 114 that enters the air distribution system 17 respectively.

In some circumstances, the outside air 114 may provide pre-conditioning of the return air 106. For example, if the ambient environment is cooler than the return air 106, the outside air 114 of the ambient environment may combine with the return air 106 to reduce a temperature of the mixed air 116 in the air distribution system 17. The outside air 114 may additionally or alternatively humidify or dehumidify the return air 106. That is, the outside air 114 may include a certain amount of moisture that may be detected, and the outside air 114 may be used to increase or decrease a composition of moisture in the mixed air 116. In certain embodiments, a rate of outside air 114 directed into the air distribution system 17 is adjustable, such as via a damper, as described above. Specifically, the rate of outside air 114 directed into the air distribution system 17 may increase or decrease based on a property of the return air 106 and/or a desired property of the mixed air 116.

The mixed air 116 may be directed through a filter 118 disposed within the housing 109. The filter 118 may include a pleated filter, an electrostatic filter, a high-efficiency particulate air (HEPA) filter, a fiber glass filter, or any combination thereof, that is implemented to remove unwanted particles from the mixed air 116. For example, the filter 118 may remove debris, contaminants, and/or other particles from the mixed air 116 to place the mixed air 116 in suitable condition for further conditioning and/or being supplied to the space 102.

The air distribution system 17 may include a heat exchanger 120 implemented to condition the mixed air 116 after the mixed air 116 passes through the filter 118. The heat exchanger 120 receives a working fluid from a working fluid circuit to place the mixed air 116 in thermal communication with the working fluid. The working fluid may include water, a refrigerant, another fluid, or any combination thereof. In some embodiments, the heat exchanger 120 may be a cooling coil and may be configured to receive the working fluid from the mechanical refrigeration system 14 of FIG. 1. In this manner, the heat exchanger 120 may place the mixed air 116 in thermal communication with the chilled liquid to enable the chilled liquid to absorb heat from the mixed air 116 and thereby cool the mixed air 116. In additional or alternative embodiments, the heat exchanger 120 may use other features to cool the mixed air 116. An amount that the mixed air 116 is cooled may be based on certain parameters, such as a desired temperature of the supply air 108 delivered to the space 102, a temperature of the technological equipment 104, a current temperature of the mixed air 116, a temperature setpoint within the space 102, and/or another suitable parameter. As will be appreciated, the heat exchanger 120 may alternatively be configured to heat the mixed air 116, such as via a heated liquid circulated through the heat exchanger 120. In some embodiments, the air distribution system 17 may include two heat exchangers 120, in which each heat exchanger 120 is configured to cool or heat the mixed air 116.

After being cooled or otherwise conditioned, the mixed air 116 may be directed toward the space 102 to be conditioned via a fan array 122. As used herein, a fan array 122 includes one or more fans 124 that may be operated to increase a speed of the mixed air 116 to be delivered to the space 102 as the supply air 108. In some embodiments, operation of the fan array 122 may be adjustable to adjust an amount that the mixed air 116 speed is increased. For example, the one or more fans 124 of the fan array 122 may be variable speed fans that may be operated at a range of speeds. Specifically, operating fans 124 at a higher speed may result in a greater increase of the speed of the mixed air 116, and operating the fans 124 at a lower speed may result in a smaller increase of the speed of the mixed air 116 within the air distribution system 17. Additionally or alternatively, the fan array 122 may adjust the speed of the mixed air 116 by adjusting a number of the fans 124 in operation. That is, operation of each fan 124 may be enabled and/or suspended based on a desired increase in speed of the mixed air 116.

Adjusting the speed of the mixed air 116 may result in an adjustment of a rate of supply air 108 delivered to the space 102, which is an amount of supply air 108 delivered to the space 102 from the air distribution system 17 within an interval of time. The rate of supply air 108 delivery may adjust a rate that the space 102 is conditioned. For example, the rate at which the supply air 108 is provided to the space 102 may determine a rate at which a detected temperature of the space 102 is adjusted toward a desired temperature of the space 102.

In certain embodiments, operation of the heat exchanger 120 of the air distribution system 17 may be suspended or the air distribution system 17 may not include the heat exchanger 120. In this manner, the mixed air 116 may be output into the space 102 without being conditioned by the heat exchanger 120. Such implementations of the air distribution system 17 may be considered free cooling of the space 102.

As mentioned above, a fire suppression system 126 may be in fluid communication with the air distribution system 17 and may be implemented to output a fire suppression agent into the air flow path in the air distribution system 17. More specifically, the fire suppression system 126 may be integrated with the air distribution system 17. The fire suppression system 126 may include vessels 128 configure to store the fire suppression agent until usage of the fire suppression system 126 is desired. The fire suppression agent may include an inert gas, carbon dioxide, watermist, fluorocarbon, halocarbon, or any combination thereof, that is configured to combine with the mixed air 116 and suppress a flame or other combustion. The fire suppression system 126 may include orifices 130 configured to output the fire suppression agent into the mixed air 116. The fire suppression agent may be directed from the vessels 128 to the orifices 130 via a conduit 132 or multiple conduits 132 that are each fluidly separate from the heat exchanger flowing the working fluid therethrough. As used herein, the orifice 130 may be any device configured to direct the fire suppression agent out of the conduit 132 and into the airflow path of the air distribution system 17. For example, the orifice 130 may include a nozzle, an outlet, an opening, a vent, or any other suitable aperture. Additionally, the conduit 132 may include any component configured to flow fire suppression agent from the vessels 128 to the orifices 130, such as tubing and/or piping. Operation of each orifice 130, such as a size of an opening of the orifice 130, may be adjustable to enable adjustment of a flow rate and/or an amount of fire suppression agent output into the air flow of the air distribution system 17.

As illustrated in FIG. 2, the fire suppression system 126 is positioned within the housing 109 and is positioned downstream of the fan array 122 with respect to the flow of air. For example, components of the fire suppression system 126 may be positioned between the fan array 122 and air supply duct 20. As such, fire suppression agent output from the orifices 130 may combine with the mixed air 116 that is already flowing at a speed increased by the fan array 122. However, it should also be understood that components of the fire suppression system 126 may be positioned upstream of the fan array 122, such as between the fan array 122 and the heat exchanger 120. In this manner, fire suppression agent output from the orifices 130 may combine with the mixed air 116 within the air distribution system 17 prior to being directed through the fan array 122 and thus, the fan array 122 may increase the speed of the combination of mixed air 116 and fire suppression agent toward the space 102. Indeed, the components of the fire suppression system 16 may be positioned in any suitable location within the housing 109 or adjacent to the housing 109. For example, the vessels 128 may be positioned external and adjacent to the housing 109, the orifices 130 may be positioned within the housing 109 and within the airflow path, and the conduit 132 may extend from the vessels 128, into the housing 109, and to the orifices 130. In this way, the orifices 130 may output the fire suppression agent into the air flow path within the housing 109, but placement of the vessels 128 external to the housing 109 may limit a space within the housing 109 that is occupied by the fire suppression system 126.

In certain embodiments, operation of the fan array 122 may be adjusted in response to operation of the fire suppression system 126. More specifically, operation of the fan array 122 may be adjusted based on a detection of an indication of the fire suppression agent flowing into the air flow path within the housing 109. For example, when the fire suppression agent is output into the air flow path, a greater number of fans 124 of the fan array 122 may be operated and/or the fans 124 of the fan array 122 may be operated at a higher speed to enable a greater increase of speed of the mixed air 116 and the fire suppression agent delivered into the air flow path. The increased speed may better combine the air flow and the fire suppression agent together and/or deliver the supply air 108 and the fire suppression agent to the space 102 at a higher rate to enhance a performance of the fire suppression system 126. Generally, the air distribution system 17 may be operated to deliver both conditioned supply air 108 and fire suppression agent simultaneously to the space 102 at any desired or suitable flow rate.

The air distribution system 17 may be communicatively coupled to a controller 134. The controller 134 may include a memory 136 and a processor 138. The memory 136 may be a mass storage device, a flash memory device, removable memory, or any other non-transitory computer-readable medium that includes instructions regarding control of the air distribution system 17. The memory 136 may also include volatile memory such as randomly accessible memory (RAM) and/or non-volatile memory such as hard disc memory, flash memory, and/or other suitable memory formats. The processor 138 may execute the instructions stored in the memory 136, such as instructions to adjust an operation of the air distribution system 17. As an example, the controller 134 may adjust operation of the heat exchanger 120, the fan array 122, and/or the fire suppression system 126 to adjust a conditioning of the air flow in the air distribution system 17. The controller 134 may be communicatively coupled to sensors 140 configured to detect a parameter of air, such as the return air 106, the outdoor air 114, the mixed air 116, and/or the supply air 108. In some embodiments, the sensors 140 may be placed within the housing 109 of the air distribution system 17, such as near the air return duct 18 to determine a property of the return air 106. The measured or detected propriety of the return air 106 may be used to determine a desired amount of conditioning of the return air 106 to produce the supply air 108. In additional or alternative embodiments, the sensors 140 may be placed in the space 102 to determine a property of air within the space 102, near the air supply 20 duct to determine a property of the supply air 108, near an outdoor air duct to determine a property or the outdoor 118, or any other suitable location. The sensors 140 may detect parameters such as a temperature, a pressure, a humidity, or any combination thereof. The controller 134 may use the detected parameters to determine an operation of the air distribution system 17 to condition the air flow.

In certain embodiments, the sensors 140 may detect certain particles in the return air 106 and/or the air in the space 102 to determine a desired operation of the fire suppression system 126. By way of example, the sensors 140 may detect if there are combustion products or other elements within the return air 106 and/or the air within the space 102. Based on a detected amount of combustion products or other elements, the controller 134 may adjust the operation of the fire suppression system 126, such as by adjusting actuators 142 of the fire suppression system 126, which may adjust an opening of one or more valves 143 configured to release fire suppression agent from the vessels 128. Additionally or alternatively, one or more valves 143 may be positioned along the conduit 132, and may be controlled by actuators 142, to adjust an amount of fire suppression agent supplied from the vessels 128 to the orifices 130. The controller 134 may also adjust actuators 142 to adjust operation of the orifices 130 to adjust an amount of fire suppression agent output into the air flow path. For instance, the controller 134 may adjust an opening size of the orifices 130 to output an amount of fire suppression agent into the air flow path within the housing 109 at a certain rate based on a value of an amount of combustion products or other elements that is detected in the return air 106 by the sensors 140.

In additional or alternative embodiments, the sensors 140 may detect an amount of fire suppression agent, such as in the space 102, in the return air 106, and/or in the supply air 108, and/or an amount of fire suppression agent emitted by the orifices 130. Based on the detected amount of fire suppression agent, the controller 134 may adjust the operation of the fan array 122. That is, the controller 134 may adjust an amount that the speed of the mixed air 116 is increased based on the amount of fire suppression agent detected by the sensors 140. For example, the speed of the mixed air 116 may be increased by a greater amount when the sensors 140 detect a greater amount of fire suppression agent in the mixed air 116.

It should be understood that the air distribution system 17 and the fire suppression system 126 may include components not illustrated in FIG. 2. For example, the air distribution system 17 and the fire suppression system 126 may include a power source that may be separate from a power source supplying power to the space 102. In this manner, the air distribution system 17 may continue to operate even if power is not being delivered to the space 102. For example, instead of or in addition to being powered by a utility grid, the air distribution system 17 and the fire suppression system 126 may be powered by a dedicated generator or other generator system, a battery, or other separate power source.

In certain embodiments, the fire suppression system 126 may include additional fans for use to increase a flow rate of the fire suppression agent within the housing 109 to enhance mixing of the fire suppression agent with the air flow in the air distribution system 17 and/or to enhance or expedite supply of the fire suppression agent to the space 102. It should also be understood that, although FIG. 2 illustrates a certain number of various components of the fire suppression system 126, such as a certain number of vessels 128, orifices 130, and fans 124 of the fan array 122, there may be any suitable number of components in the air distribution system 17 and the fire suppression system 126. The number of each component may be based on various design parameters, such as footprint allowance, an area of the space 102, a volume of the space.

Furthermore, FIG. 2 illustrates the air flow as being directed along a particular flow path through the air distribution system 17. Specifically, return air 106 enters the air distribution system 17 in a first direction 144 and the portion 110 of air is removed as exhaust in a second direction 146 transverse to the first direction 144. Additionally, the outside air 114 enters the air distribution system 17 in a third direction 148 opposite the first direction 144, and the return air 106 and the outside air 114 combine to form mixed air 116 that is directed through the housing 109 in a fourth direction 150 transverse to both the first direction 144 and the third direction 148. The mixed air 116 is then directed within the housing 109 in a fifth direction 152 through the filter 118, the heat exchanger 120, the fan array 122, and eventually out of the air distribution system 17 as the supply air 108 via the air supply duct 20. However, it should be appreciated that any of the air flows described herein may be directed through the air distribution system 17 in other directions that are not depicted in FIG. 2. In other words, the air distribution system 17 and/or the housing 109 may have any suitable configuration configured to receive, combine, and/or supply one or more air flows, while also including the integrated fire suppression system 126.

Figure 3:
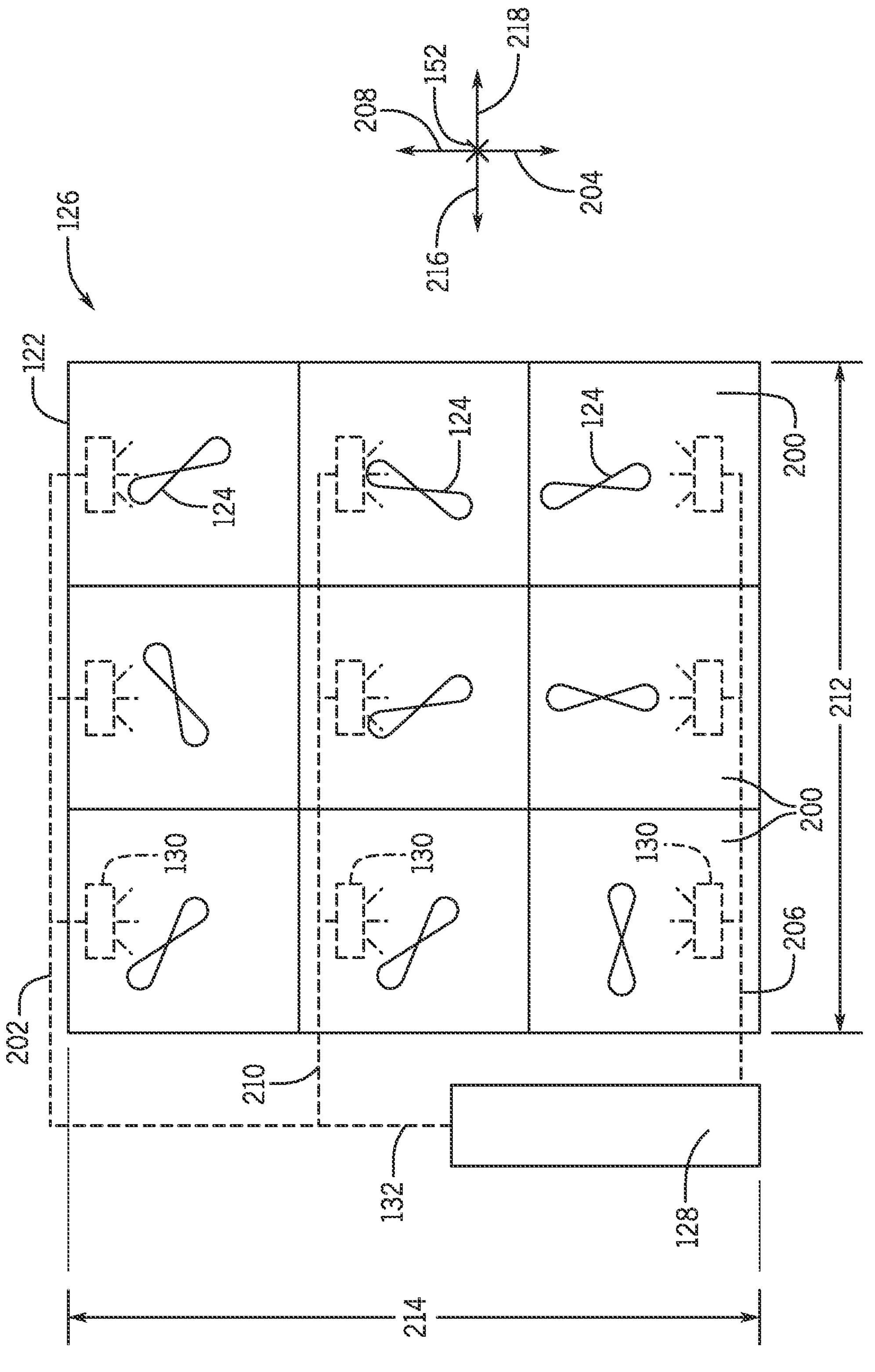
FIG. 3 is a schematic view of an embodiment of a fire suppression system that may be integrated with an air distribution system, in accordance with an aspect of the present disclosure.

FIG. 3 illustrates a schematic of an embodiment of the fire suppression system 126 that may be used in the air distribution system 17 of FIGS. 1 and 2. As depicted in FIG. 3, the fire suppression system 126 includes orifices 130 disposed about and/or adjacent to the fan array 122. Specifically, the fan array 122 includes or defines cells 200 or sections of the air flow path, in which each cell 200 includes a respective one of the fans 124 disposed therein, such that the fan 124 may direct air flow in the fifth direction 152 through the cell 200 having the fan 124. The orifices 130 may be positioned to output fire suppression agent into the air flow path, such as in a direction cross-wise to the fifth direction 152 and the rotational axes of the fans 124. The orifices 130 may be positioned to output the fire suppression agent upstream or downstream of the fans 124 to combine with the air. It should be understood the orifices 130 may be disposed at different orientations to output the fire suppression agent cross-wise to the fans 124 and into the air flow. For example, the orifices 130 may be disposed at a first position 202, which may be a top portion of the housing 109. At the first position 202, the orifices 130 may output the fire suppression agent in a first direction 204, such as a downward direction, in which the first direction 204 is transverse to the fifth direction 152 to enable the fire suppression agent to be directed across a certain number of cells 200 and/or fans 124. The orifices 130 may additionally or alternatively be disposed at a second position 206, which may be a bottom portion of the housing 109. At the second position 206, the orifices 130 may output the fire suppression agent in a second direction 208, such as an upward direction, generally opposite the first direction 204. The orifices 130 may further be disposed at a third position 210, or mid-section of the housing 109. At the third position 210, the orifices 130 may output the fire suppression agent in either or both of the first direction 204 and the lateral direction 208 across the fan array 122.

It should be understood that there may be any number of orifices 130 disposed adjacent to the fan array 122 in the first position 202, the second position 206, and/or the third position 210. Indeed, the number of orifices 130 at each position 202, 206, 210 may be the same or different as other positions. The orifices 130 may also be disposed in other positions not illustrated in FIG. 3. The illustrated embodiment depicts the first position 202, the second position 206, and the third position 210 as aligned across a first length 212, or a width, of the fan array 122. However, in additional or alternative embodiments, the orifices 130 may be aligned across a second length 214, or a height, of the fan array 122 and may output fire suppression agent in a third direction 216 and/or a fourth direction 218, which may be sideways or lateral directions. Furthermore, the orifices 130 may be aligned in other positions, such as at an angle to both the first length 212 and the second length 214 or in a staggered alignment, a random alignment, or any other suitable alignment across the fan array 122.

The vessels 128 of the fire suppression system 126 may be placed in a position offset from the fan array 122. In this manner, the vessel 128 may not interfere with the air flow passing through the fan array 122 to avoid impacting or impeding the flow of air, which may increase a pressure drop of the air flow and/or decrease the speed of the air flow. In certain embodiments, the vessels 128 may be disposed exterior to the housing 109 of the air distribution system 17, but the conduit 132 connecting the vessels 128 with the orifices 130 may extend into the housing 109. In this manner, the fire suppression agent may be supplied from the vessel 128 exterior to the housing 109 into the air flow path interior to the housing 109 to be output across the fan array 122. However, in other embodiments, the vessels 128 may be disposed within the housing 109, such that the vessels 128, conduits 132, and orifices 130 are contained within the housing.

Figure 4:
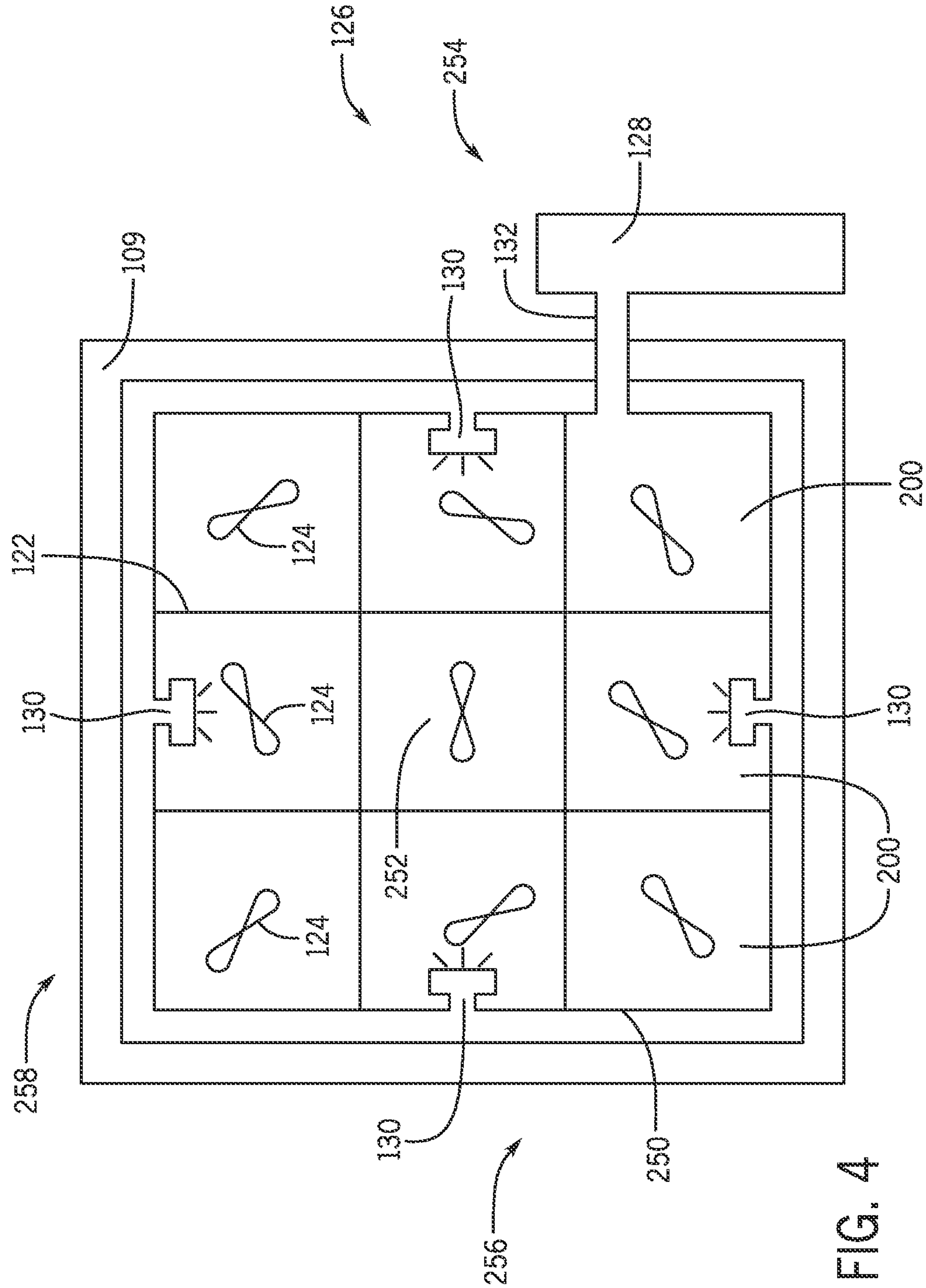
FIG. 4 is a schematic view of an embodiment of a fire suppression system integrated with an air distribution system in accordance with an aspect of the present disclosure.

FIG. 4 is a schematic of another embodiment of the fire suppression system 126 that may be used in the air distribution system 17 of FIGS. 1 and 2. As shown in FIG. 4, the conduit 132 connecting the vessels 128 with the orifices 130 surrounds or extends about a border or perimeter 250 of the fan array 122. For example, the conduit 132 may extend about the perimeter 250 or a portion of the perimeter 250 of the fan array 122 and may be coupled to a supporting structure of the fan array 122, to a surface of the housing 109, or to any other suitable component within the housing 109. The orifices 130 may each extend from the conduit 132 toward a center 252 of the fan array 122, where each orifice 130 is configured to output fire suppression agent generally towards the center 252. Thus, the orifices 130 may output fire suppression agent in different directions from one another based on a location of the orifice 130 relative to the center 252. As will be appreciated, any suitable number of orifices 130 may be used. Generally, the fire suppression agent may be output toward the air flow passing through the fan array 122 to be mixed with the air flow. It should be understood that, although FIG. 4 illustrates a certain number of orifices 130 included in the fire suppression system 126, there may be any number of orifices 130 positioned anywhere around the perimeter 250 of the fan array 122.

Similar to FIG. 3, the vessel 128 of FIG. 4 may be positioned outside of the housing 109 of the air distribution system 17 to avoid interference with the air flow directed through the fan array 122. To this end, the conduit 132 may extend from the vessel 128 into the housing 109 to fluidly connect the orifices 130 within the housing 109 with the vessel 128 outside of the housing 109 and to direct fire suppression agent from the vessel 128 to the orifices 130. The vessel 128 may be disposed at any suitable position relative to the housing 109. In certain embodiments, the fire suppression system 126 may include multiple vessels 128 disposed at different positions relative to the housing 109. As an example, one vessel 128 may be disposed at a first side 254 of the housing 109, another vessel 128 may be disposed at a second side 256 of the housing 109, and another vessel 128 may be disposed at a third side 258 of the housing 109, where each vessel 128 is fluidly coupled to one or more conduits 132 extending into the housing 109.

Additionally, it should be understood that, although the cells 200 of the fan array 122 of FIGS. 3 and 4 are depicted as aligned in a generally square or rectangular shape, the cells 200 of the fan array 122 may be arranged in any suitable shape to direct air flow through the air distribution system 17. The fan array 122 may also include any number of cells 200 and any number of corresponding fans 124 in each cell 200. In certain embodiments, the fire suppression system 126 may adjust a total amount of fire suppression agent output into the air flow by adjusting a number orifices 130 open and/or in operation to output the fire suppression agent. In other words, the fire suppression system 126 may be operated to enable the fire suppression agent to be output from a subset of the orifices 130 and to block the fire suppression agent from being output from a remaining subset of the orifices 130.

Figure 5:
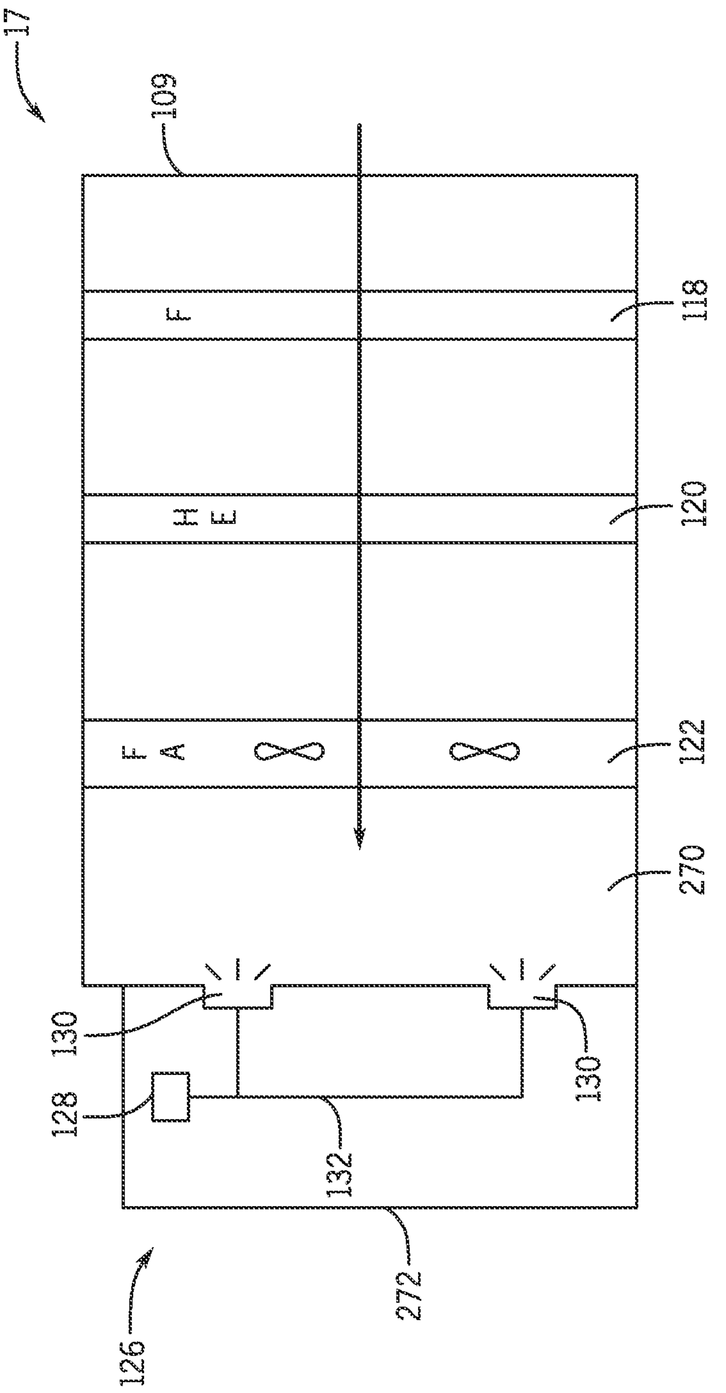
FIG. 5 is a schematic view of another embodiment of an air distribution system integrated with a fire suppression system, which may be utilized in an HVAC system, in accordance with an aspect of the present disclosure.

FIG. 5 is a schematic view of another embodiment of the air distribution system 17. In FIG. 5, the fire suppression system 126 is disposed external to the housing 109 of the air distribution system 17. As shown, the air flow may be directed through the housing 109 and across the filter 118, the heat exchanger 120, and the fan array 122. Thereafter, the air flow may flow into a section 270 of the housing 109 downstream of the fan array 122. In illustrated embodiment, the fire suppression system 126 is integrated with the air distribution system 17 via a fire suppression housing 272, such as a detachable vestibule, that is in fluid communication with the section 270. As similarly discussed above, the fire suppression system 126 is configured to output fire suppression agent into the section 270 to combine the fire suppression agent with the air flow.

As shown, the fire suppression housing 272 contains the vessel 128 and the conduit 132. Additionally, the fire suppression housing 272 may include the orifices 130 configured to direct the fire suppression agent from the conduit 132 within the fire suppression housing 272 and into the air flow path within the housing 109, where the fire suppression agent combines with the air flow. The combined air flow and fire suppression agent within the section 270 may then be directed, such as via the fan array 122, to the space 102.

It should be appreciated that the fire suppression system 126 may be disposed at a different position relative to the housing 109 than the position depicted in FIG. 5. For example, in some embodiments, the fire suppression system 126 may be disposed at a position to enable output of the fire suppression agent into the air flow path between the heat exchanger 120 and the fan array 122. In certain embodiments, there may be a plurality fire suppression systems 126 in fluid communication with the air distribution system 17, where each fire suppression system 126 of the plurality of fire suppression systems 126 is implemented to output fire suppression agent at a different part of the air flow path within the housing 109. Furthermore, the separate fire suppression housing 272 configuration of the illustrated embodiment may be implemented with existing air distribution systems. In other words, the fire suppression system 126 may be retrofitted to integrate with existing air distribution systems.

FIG. 6 is a schematic view of another embodiment of the air distribution system 17 integrated with the fire suppression system 126. In the illustrated embodiment, the air distribution system 17 and fire suppression system 126 are configured to supply conditioned air and/or fire suppression agent to different zones serviced by the air distribution system 17. Specifically, the air distribution system 17 includes the integrated fire suppression system 126 and is configured to supply conditioned air and/or fire suppression agent to a first zone 300, a second zone 302, and a third zone 304. Although FIG. 6 illustrates three zones 300, 302, 304 fluidly coupled to the air distribution system 17, the air distribution system 17 may be fluidly coupled to any suitable number of zones. As should be understood, the air distribution system 17 may supply air flow to the zones 300, 302, 304 independently of one another via an air supply duct 20. For example, each zone 300, 302, 304 may have different temperature setpoints and associated calls for conditioning. Each zone 300, 302, 304 may also include one of the sensors 140 configured to detect a condition of the respective zones 300, 302, 304, such as a temperature within the respective zones 300, 302, 304. Based on the temperature detected by the sensor 140 and a temperature setpoint, the air distribution system 17 and/or an HVAC system having the air distribution system 17 may distribute a respective appropriate air flow to each zone 300, 302, 304. As an example, the first zone 300 may receive an air flow at a first rate of air flow, the second zone 302 may receive an air flow at a second rate of air flow, and the third zone 304 may receive an air flow at a third rate of air flow. Generally, certain properties of the air flow delivered by the air distribution system 17 may be independently controlled for each of the zones 300, 302, 304.

To this end, the air supply duct 20 may include a first supply branch 308 fluidly coupled to the first zone 300, a second supply branch 310 fluidly coupled to the second zone 302, and a third supply branch 312 fluidly coupled to the third zone 304. In this manner, the air distribution system 17 may deliver a conditioned air flow into the air supply duct 20, where the conditioned air flow may split into the different supply branches 308, 310, 312 to be directed into the respective zones 300, 302, 304. Each supply branch 308, 310, 312, may include a respective supply damper 314 configured to regulate an amount of air flow through the respective supply branches 308, 310, 312 to the respective zones 300, 302, 304 at a particular rate. In other words, the respective supply dampers 314 may be independently controlled from one another to enable air flow to be supplied to the zones 300, 302, 304 at different rates. For example, each supply damper 314 may increase an opening to increase a rate of air flow to the respective zones 300, 302, 304, and each supply damper 314 may reduce an opening to decrease a rate of air flow to the respective zones 300, 302, 304.

Each zone 300, 302, 304 may also be fluidly coupled to the air return duct 18 via return air branches in order to direct return air from the zones 300, 302, 304 to the air distribution system 17. To this end, the air return duct 20 may include a first return branch 318 fluidly coupled to the first zone 300, a second return branch 320 fluidly coupled to the second zone 302, and a third return branch 322 fluidly coupled to the third zone 304. Each return branch 318, 320, 322 may also include a respective return damper 324 configured to direct air from the respective zones 300, 302, 304 to the air distribution system 17 at a selected rate of air flow. In this manner, the respective zones 300, 302, 304 may direct air flow through the respective return branches 318, 320, 322 to the air return duct 20 at rates independent from one another.

The controller 134 may be used to enhance delivery of conditioned air to the zones 300, 302, 304. For example, as discussed above, the sensors 140 may be communicatively coupled to the controller 134. Based on the detections of the sensors 140, the controller 134 may adjust operation of the air distribution system 17, the supply dampers 314, and/or the return dampers 324 to adjust a property of air directed into the zones 300, 302, 304.

In some embodiments, the air distribution system 17 may also be configured to deliver the fire suppression agent at different rates to each zone 300, 302, 304, such as based on the respective conditions of each zone 300, 302, 304. For example, the respective supply dampers 314, return dampers 324, and/or sensors 140 disposed in the zones 300, 302, 304 and/or the air return duct 20 may be used to enhance delivery of fire suppression agents. In some embodiments, in response to detection of combustion products in the return air, the fire suppression system 126 may be operated to output fire suppression agent into the air flow path of the air distribution system 17 to combine with the air flow delivered to the zones 300, 302, 304. Each supply damper 314 may open to permit the combined air and fire suppression agent to be directed into each zone 300, 302, 304. In this manner, each zone 300, 302, 304 may receive fire suppression agent, which may limit a likelihood of fire to spread and/or which may extinguish any fire in the zones 300, 302, 304. For example, a fire may exist in the first zone 300 and not the second zone 302 or third zone 304, but the fire suppression agent may be supplied to the first zone 300, the second zone 302, and the third zone 304. The fire suppression agent delivered to the first zone 300 may suppress the fire. Additionally, the fire suppression agent delivered to the second zone 302 and the third zone 304 may block the fire in the first zone 300 from spreading to the second zone 302 and/or the third zone 304.

In additional or alternative embodiments, the respective air flows supplied to the zones 300, 302, 304 may be adjusted based on a detection of a location of a fire or combustion byproducts. In other words, the controller 134 may detect where a fire or combustion byproducts may exist within one or more of the zones 300, 302, 304. Accordingly, based on the location of the fire or combustion byproducts, the controller 134 may adjust the rate at which air is supplied to the zones 300, 302, 304, such as by adjusting respective positions of the supply dampers 314 and/or the return dampers 324. To this end, the controller 134 may compare respective amounts of combustion byproducts detected by the respective sensors 140 disposed in the zones 300, 302, 304 to determine where a fire or combustion byproducts may be. As an example, the controller 134 may determine that a fire or combustion byproducts exist in the first zone 300 if the amount of combustion byproducts detected by the sensor 140 disposed in the first zone 300 exceeds a respective amount of combustion byproducts detected by the sensor 140 disposed in the second zone 302 and/or by the sensor 140 disposed in the third zone 304.

In response to determining the location of fire or combustion, the controller 134 may adjust a rate of air flow directed to the respective zones 300, 302, 304. For example, if fire or combustion is determined to exist in the first zone 300, the supply damper 314 disposed in the first supply branch 308 may be opened or further opened to increase a rate of air flow into the first zone 300. Additionally or alternatively, the supply damper 314 disposed in the second supply branch 310 and/or the supply damper 314 disposed in the third supply branch 312 may be closed or further closed to decrease a rate of air flow into the second zone 302 and/or the third zone 304 to enable a greater portion of air supplied by the air distribution system 17 to be directed into the first zone 300. As such, a greater amount of fire suppression agent may be directed into the first zone 300 as compared to the second zone 302 and the third zone 304 to suppress the fire or combustion within the first zone 300.

In further embodiments, the controller 134 may adjust respective positions of the return dampers 324 to adjust an amount of air returning from the zones 300, 302, 304 to the air distribution system 17. For example, if the controller 134 determines that fire or combustion exists in the first zone 300, the controller 134 may substantially close or partially close the return damper 324 of the first return branch 318 to reduce a rate at which air flow is directed out of the first zone 300. In this manner, an amount of fire suppression agent within the first zone 300 may increase as the air distribution system 17 continues to deliver fire suppression agent into the first zone 300 and fire suppression agent is blocked from exiting the first zone 300 via the return air damper 324 of the first return branch 318.

After a certain amount of time, the controller 134 may cease concentrating a flow of air and fire suppression agent to the location of a fire or combustion. Specifically, the controller 134 may open all supply dampers 314 and all return dampers 324 to direct air and/or fire suppression agent through all zones 300, 302, 304, for example, at substantially equal air flow rates. In some embodiments, the controller 134 may cease concentrating the flow of air and fire suppression agent to a particular zone after a predetermined time interval, such as five minutes. In additional or alternative embodiments, the controller 134 may cease concentrating the flow of air and fire suppression agent to a particular zone based on readings by the sensors 140. For example, the controller 134 may cease concentrating the flow of air and fire suppression agent to a particular zone when the amount of combustion by products detected by the sensor 140 within each zone 300, 302, 304 has dropped below a predetermined threshold.

It should be understood that, in further embodiments, the air distribution system 17 may supply fire suppression agent to a portion or subset of the zones 300, 302, 304. In other words, the air distribution system 17 may supply the combined air flow and fire suppression agent to one or more of the zones 300, 302, 304 and may supply the air flow without the fire suppression agent to a remainder of the zones 300, 302, 304. The air distribution system 17 may additionally or alternatively supply air with different concentrations of fire suppression agent to the different zones 300, 302, 304. For example, air supplied by the air distribution system 17 to the first zone 300 may be more concentrated with fire suppression agent as compared to air supplied by the air distribution system 17 to the second zone 302 and/or the third zone 304. The controller 134 may adjust operation of the air distribution system 17, the supply dampers 314, and/or the return dampers 324 based on detections by the sensors 140, a time interval, and/or another parameter to enable adjustment of fire suppression agent concentration within the supplied air flows.

For example, to supply air flow with fire suppression agent to the first zone 300, the supply dampers 314 of the second and third supply branches 310 and 312 may be closed, while the supply damper 314 of the first supply branch 308 is opened. In this configuration, the fire suppression system 126 may output fire suppression agent into the air flow within the air distribution system 17, and the configuration of supply dampers 314 may direct the combined air flow and fire suppression agent into the first zone 300 but not the second or third zones 302 and 304. Subsequently, the supply damper 314 of the first supply branch 308 may be closed, and the supply dampers 314 of the second and third supply branches 310 and 312 may be opened. In this configuration, delivery of fire suppression agent into the air flow of the air distribution system 17 may be suspended, and the air distribution system 17 may deliver air substantially free of fire suppression agent to the second and third zones 302 and 304. In this manner, the air distribution system 17 may supply air with different concentrations of fire suppression agent to the different zones 300, 302, 304.

FIG. 7 is a schematic of an embodiment of a split HVAC system 350 that may include the fire suppression system 126. The HVAC system 350 may provide heated and/or cooled air to a structure 352, such as a home or residence, and may include refrigerant conduits 354 that operatively couple an indoor unit 356 to an outdoor unit 358 of the split HVAC system 350. As an example, the split HVAC system 350 may be implemented to provide heated and/or cooled air to a residential structure, where the indoor unit 356 may be positioned in a utility room, an attic, a basement, and so forth. The outdoor unit 358 may be situated adjacent to an external side of the structure 352 and may be covered by a shroud to protect the system components, such as from debris or other contaminants from entering the outdoor unit 358.

The HVAC system 350 may place an air flow in thermal communication with a working fluid, such as a refrigerant. For example, the outdoor unit 358 may include a heat exchanger 360 implemented to place the working fluid in thermal communication with ambient air, such as via fans 362, and may direct the working fluid to a heat exchanger 364 of the indoor unit 356. The indoor unit 356 may include the air distribution system 17 to direct air through an air flow path, where the air is conditioned in the indoor unit 356 and is supplied to spaces 17 serviced by the HVAC system 350. For example, a blower or fan 366 of the indoor unit 356 may direct air through or across the heat exchanger 364, where the air is placed in thermal communication with a working fluid in the heat exchanger 364. Thereafter, the air may be directed through ductwork 24 to spaces within the structure 352 serviced by the HVAC system 350.

In certain embodiments, the fire suppression system 126 is in fluid communication with the air flow path having the heat exchanger 364 and the ductwork 24. For example, the fire suppression system 126 may be in fluid communication with an enclosure 370 between the heat exchanger 364 and the ductwork 24. The enclosure 370 may receive fire suppression agent from the fire suppression system 126 therein to combine with the air flow. The combined air flow and fire suppression agent may then be directed through the ductwork 24.

In additional or alternative embodiments, the fire suppression system 126 may be in fluid communication with the enclosure 370 disposed between the fan 366 and the heat exchanger 364. In this manner, the air is directed through the enclosure 370 prior to exchanging heat with the working fluid in the heat exchanger 364. Thus, when the fire suppression system 126 outputs fire suppression agent into the enclosure 370, the air flow and the fire suppression agent may combine prior to being conditioned by the heat exchanger 364. As a result, the heat exchanger 364 may place the combined air flow and the fire suppression agent in thermal communication with the working fluid.

The illustrated embodiment of the fire suppression system 126 of FIGS. 2-7 may be retrofitted with existing air distribution systems 17. In other words, existing air distribution systems 17 may be modified to receive fire suppression agent within the air flow path via the fire suppression system 126. For example, the vessels 128, orifices 130, and conduit 132 may be implemented within existing air distribution systems 17 to produce the embodiment of the air distribution system 17 of FIG. 2. Additionally or alternatively, embodiments of the fire suppression system 126 may be appended to existing components of air distribution systems 17. As an example, the housing 109 of the air distribution system 17 may be placed in fluid communication with the fire suppression housing 272 of the fire suppression system 126 to enable the fire suppression agent to be directed into the air flow path of the air distribution system 17.

Embodiments of the present disclosure may provide one or more technical effects useful in the operation of air distribution systems, which may be associated with an HVAC system. For example, a fire suppression system may be fluidly coupled to an air distribution system. Specifically, a fire suppression system may be implemented to output fire suppression agent into an air flow path of the air distribution system. As a result, air directed through the air distribution system may combine with the fire suppression agent. Thereafter, the air distribution system may direct the combined air flow and fire suppression agent to spaces serviced by the air distribution system. Placing the fire suppression system in fluid communication with the air distribution system may reduce a cost and complexity of servicing the spaces. By integrating the fire suppression system with the air distribution system, an area or footprint occupied by the fire suppression system in each space serviced by the air distribution system may be limited. That is, the air distribution system with an integrated fire suppression system may be capable of supplying fire suppression agent to each space serviced by the air distribution system without having additional fire suppression equipment disposed within each space. Thus, costs to manufacture and install fire suppression equipment may be reduced. Furthermore, an available area within the spaces for other uses may be increased. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures, pressures, and so forth, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An air handling unit, comprising:
- a housing that defines an air flow path therethrough;
- a heat exchanger disposed within the air flow path and configured to flow a working fluid therethrough;
- a fan system disposed within the housing and configured to increase a speed of an air flow directed along the air flow path;
- a nozzle configured to deliver a fire suppression agent into the air flow path; and
- a controller comprising a processor and a memory, wherein the memory comprises instructions that, when executed by the processor, are configured to cause the processor to:
  - operate the fan system to increase the speed of the air flow to a first speed based on a detection of a first amount of the fire suppression agent directed into the air flow path via the nozzle; and
  - operate the fan system to increase the speed of the air flow to a second speed based on a detection of a second amount of the fire suppression agent directed into the air flow path via the nozzle, wherein the second amount is greater than the first amount, and the second speed is greater than the first speed.

2. The air handling unit of claim 1, wherein the fan system comprises a variable speed fan, and the instructions, when executed by the processor, are configured to cause the processor to:
- operate the variable speed fan at a first fan speed to increase the speed of the air flow to the first speed based on the detection of the first amount of the fire suppression agent directed into the air flow path via the nozzle; and operate the variable speed fan at a second fan speed to increase the speed of the air flow to the second speed based on the detection of the second amount of the fire suppression agent directed into the air flow path via the nozzle.

3. The air handling unit of claim 1, wherein the fan system comprises an array of fans, and the instructions, when executed by the processor, are configured to cause the processor to:

operate a first quantity of fans of the array of fans to increase the speed of the air flow to the first speed based on the detection of the first amount of the fire suppression agent directed into the air flow path via the nozzle; and operate a second quantity of fans of the array of fans to increase the speed of the air flow to the second speed based on the detection of the second amount of the fire suppression agent directed into the air flow path via the nozzle.

4. The air handling unit of claim 3, wherein the second quantity of fans is greater than the first quantity of fans.

5. The air handling unit of claim 1, comprising a sensor configured to detect the fire suppression agent directed into the air flow path, wherein the instructions, when executed by the processor, are configured to cause the processor to operate the fan system based on data received from the sensor.

6. The air handling unit of claim 1, comprising a vessel configured to store the fire suppression agent, wherein the nozzle is fluidly coupled to the vessel and is configured to deliver the fire suppression agent from the vessel into the air flow path.

7. The air handling unit of claim 6, wherein the vessel is disposed within the housing.

8. The air handling unit of claim 1, wherein the nozzle is configured to deliver the fire suppression agent downstream of the fan system relative to a direction of the air flow along the air flow path.

9. A control system for a heating, ventilation, and/or air conditioning (HVAC) system, comprising:

a non-transitory, computer-readable medium comprising instructions that, when executed by a processor, are configured to cause the processor to:

operate a fan system of the HVAC system to direct an air flow along an air flow path within a housing of the HVAC system at a first speed based on operation of a fire suppression system of the HVAC system to deliver a fire suppression agent into the air flow path, wherein the housing comprises a heat exchanger disposed within the air flow path and configured to place a working fluid directed through the heat exchanger in thermal communication with the air flow directed along the air flow path via the fan system; and operate the fan system to direct the air flow along the air flow path within the housing at a second speed based on suspended delivery of the fire suppression agent into the air flow path via the fire suppression system, wherein the second speed is less than the first speed.

10. The control system of claim 9, wherein the instructions, when executed by the processor, are configured to cause the processor to:

operate a first quantity of fans of the fan system to direct the air flow along the air flow path at the first speed; and operate a second quantity of fans of the fan system to direct the air flow along the air flow path at the second speed.

11. The control system of claim 10, wherein the second quantity of fans is less than the first quantity of fans.

12. The control system of claim 9, wherein the instructions, when executed by the processor, are configured to cause the processor to operate a valve to adjust a flow of the fire suppression agent through a conduit to a nozzle configured to discharge the fire suppression agent into the air flow path.

13. The control system of claim 12, wherein the instructions, when executed by the processor, are configured to cause the processor to operate the valve based on a detected amount of combustion byproducts in a space conditioned by the HVAC system.

14. A heating, ventilation, and/or air conditioning (HVAC) system, comprising:

a housing defining an air flow path;

one or more fans configured to direct an air flow along the air flow path of the housing;

a heat exchanger disposed within the air flow path and configured to place the air flow in thermal communication with a working fluid directed through the heat exchanger;

a fire suppression system configured to discharge a fire suppression agent into the air flow path; and a control system comprising a processor and a memory, wherein the memory comprises instructions that, when executed by the processor, are configured to cause the processor to:

operate the one or more fans to direct the air flow along the air flow path at a first speed in response to suspended operation of the fire suppression system; and operate the one or more fans to direct the air flow along the air flow path at a second speed in response to operation of the fire suppression system to discharge the fire suppression agent into the air flow path, wherein the second speed is greater than the first speed.

15. The HVAC system of claim 14, wherein the instructions, when executed by the processor, are configured to cause the processor to:

operate the one or more fans at a first fan speed to direct the air flow along the air flow path at the first speed; and operate the one or more fans at a second fan speed to direct the air flow along the air flow path at the second speed.

16. The HVAC system of claim 14, wherein the fire suppression system comprises a vessel configured to store the fire suppression agent, and the vessel is disposed external to the housing.

17. The HVAC system of claim 14, wherein the fire suppression system is configured to discharge the fire suppression agent upstream of the one or more fans relative to a direction of the air flow along the air flow path.

18. The HVAC system of claim 14, wherein the instructions, when executed by the processor, are configured to cause the processor to operate the fire suppression system to discharge the fire suppression agent into the air flow path in response to a determination that an amount of combustion byproducts in the air flow exceeds a predetermined threshold.

19. The HVAC system of claim 18, wherein the housing comprises a first opening configured to receive the air flow from a space serviced by the HVAC system, the HVAC system comprises a sensor configured to detect the amount of combustion byproducts in the air flow received from the space, and the instructions, when executed by the processor, are configured to cause the processor to determine the amount of combustion byproducts in the air flow based on data received from the sensor.

20. The HVAC system of claim 14, wherein the one or more fans comprises a plurality of fans arrayed within the housing.

* * * * *